US007120673B2

(12) United States Patent
Kitamura et al.

(10) Patent No.: US 7,120,673 B2
(45) Date of Patent: Oct. 10, 2006

(54) COMPUTER STORAGE SYSTEM PROVIDING VIRTUALIZED STORAGE

(75) Inventors: Manabu Kitamura, Yokohama (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/991,219

(22) Filed: Nov. 16, 2001

(65) Prior Publication Data

US 2003/0212854 A1    Nov. 13, 2003

(51) Int. Cl.
G06F 15/167 (2006.01)
G06F 13/00 (2006.01)
G06F 12/00 (2006.01)
G06F 15/00 (2006.01)

(52) U.S. Cl. .................. 709/213; 709/214; 711/112
(58) Field of Classification Search ............ 709/213, 709/214, 215, 221; 711/112, 111
See application file for complete search history.

(56) References Cited

U.S. PATENT DOCUMENTS 5,544,347 A * 8/1996 Yanai et al. ................. 711/162
5,623,595 A    4/1997 Baily
5,680,640 A * 10/1997 Ofek et al. .................. 710/19
5,758,057 A    5/1998 Baba et al.
6,098,125 A * 8/2000 Fiacco et al. ................ 710/52

FOREIGN PATENT DOCUMENTS

| EP | 1130514 | | 9/2001 |
|---|---|---|---|
| EP | 1130514 A2 | * | 9/2001 |
| JP | 2001-331355 | * | 11/2001 |
| WO | WO 01/80013 | * | 10/2001 |

OTHER PUBLICATIONS

Chang-Soo Kim, Gyoung-Bae Kim, Bum-Joo Shin; Volumn Management in SAN Environment; Jun. 26, 2001; ETRI; pp. 500-505*
Khattar, Ravi, Mark S. Murphy, Giulio John Tarella, Kjell E. Nystrom, Introduction To Storage Area Network, SAN, Aug. 1999, IBM First Edition.*

* cited by examiner

Primary Examiner—Rupal Dharia
Assistant Examiner—Brian J. Gillis
(74) Attorney, Agent, or Firm—Townsend and Townsend and Crew LLP (57) ABSTRACT

In the computer system where the plurality of host computers and the plurality of storage apparatuses are interconnected, in order to carry out the data migration between the storage apparatuses transparently to the host computers, the back end server provides the virtual disk to the host computers. From the host computers, at first, the virtual disk looks the same as the old storage subsystem. When migrating the data from the old storage subsystem to the new storage subsystem, at first, the back end server instructs the data migration unit to execute the data migration processing. Subsequently, the back end server switches the setting of the virtual disk, thereby causing the virtual disk to correspond to the new storage subsystem.

15 Claims, 9 Drawing Sheets

| ADDRESS | FLAG |
|---------|------|
| LBA0 | 1 |
| LBA1 | 1 |
| LBA2 | 0 |
| LBA3 | 0 |
| LBA4 | 1 |
| ⋮ | ⋮ |
| LBAn | 0 |

COMPUTER STORAGE SYSTEM PROVIDING VIRTUALIZED STORAGE

BACKGROUND OF THE INVENTION

The present invention relates to a data access method to a storage apparatus system in an information processing system or the like. More particularly, it relates to a data migration method within the storage apparatus system.

An increasingly prevailing trend is that a plurality of platforms and a plurality of storage apparatuses are connected to each other so that the platforms and the storage apparatuses will be integrated into so-called a single network. Here, the platforms are, for example, a personal computer, a workstation, and a mainframe which employ mutually different architectures and operating systems. This resultant network is generally referred to as "SAN (Storage Area Network)", which is a technical term corresponding to "LAN (Local Area Network)" formed by connecting a plurality of computers by a network such as Ethernet. In SAN, usually, the computers and the storage apparatuses are connected using a communication line referred to as "Fibre Channel" formed of an optical cable or a copper wire.

It has been pointed out that SAN has several advantages. The first advantage is to provide an environment where the storage apparatuses can be accessed from the plurality of computers in common. The second advantage is that the data transfers among the storage apparatuses are made possible by interconnecting the storage apparatuses among themselves. This makes it possible to implement backups or data copies among the storage apparatuses without imposing a load onto the host computers, thereby, at the time of the storage apparatuses' failure, allowing the switching to storage apparatuses included in a secondary system. Thirdly, until now, the individual storage apparatuses have been connected to the individual computers, respectively. As a result, managing the individual storage apparatuses (i.e., monitoring the states of the apparatuses, and modifying the settings thereof) has been possible only from the individual computers connected thereto. In SAN, however, it becomes possible to manage all the storage apparatuses from an arbitrarily specified computer. Also, the conventional SCSI (Small Computer System Interface) could connect only 16 appliances at the maximum. Meanwhile, Fibre Channel can connect 100 or more appliances on-line, thereby making it possible to obtain an easy scalability.

In recent years, a large number of products for implementing SAN have appeared. There exists, however, none of the products that actually make full utilization of the above-described advantages. In the scalability in particular, although the on-line connection of the appliances has been made physically possible, fundamental technologies for taking full advantage of the scalability are lacking. In SAN, for example, when additionally installing a new disk apparatus for the replacement of an existing disk apparatus, the additional installation of the appliance can be carried out on-line. Concerning the data migration, however, the users usually need to explicitly instruct the data migration into the new disk apparatus after switching the connection off-line once. For the users to enjoy the merits by the appliance additional-installation during the on-line, in addition to the mere hardware additional-installation, it is also required to carry out the data migration or the like transparently to the users, i.e., in such a manner that the users are unconscious of the data migration or the like, in accompaniment with the hardware additional-installation.

Concerning the on-line data migration among the disk apparatuses, U.S. Pat. No. 5,680,640 has disclosed its example. The example in U.S. Pat. No. 5,680,640, which describes the data migration where the disk apparatuses designed for a mainframe are assumed, utilizes communication lines for connecting the disk apparatuses, and only disconnects the connections among the hosts and the disk apparatuses for a short time. After that, the example allows the data migration among the disk apparatuses to be implemented transparently to the users.

U.S. Pat. No. 5,680,640 allows the data migration among the disk apparatuses to be implemented unlimitedly transparently to the users. However, this is the data migration method where the for-mainframe-designed disk apparatuses are assumed, and thus this method is inapplicable to SAN. In the for-mainframe-designed disk apparatuses as disclosed in U.S. Pat. No. 5,680,640, when replacing an old disk apparatus by a new disk apparatus, the setting on the disk apparatus side makes it possible to make the new disk apparatus look as if it were the old disk apparatus when seen from the host side. This is made possible by manipulating the setting of device numbers or the like of the disk apparatuses.

However, in SAN, especially in the case of, e.g., the Fibre Channel environment, the individual unique IDs assigned to the individual disk apparatuses are determined by the negotiation among the appliances (i.e., the disk apparatuses, and a fibre channel switch) included in the network. Accordingly, the setting made by the users never changes the IDs. This condition, when using the data migration method in U.S. Pat. No. 5,680,640, makes it impossible to make the new disk apparatus disguise the old disk apparatus with respect to the host computers. Consequently, in reality, it is impossible to implement the data migration that is transparent to the hosts and the users.

SUMMARY OF THE INVENTION

It is an object of the present invention to provide a system that is transparent to the hosts and the users, and that is capable of making full utilization of the scalability of SAN.

The computer system in the present invention includes, for example, host computers, a back end computer (back end server), a plurality of storage subsystems, and a switch for connecting at least the host computers with the back end computer. The host computers access each storage subsystem via the back end computer. Here, the back end computer provides one virtual disk apparatus or a plurality of virtual disk apparatuses to the host computers. If the host computers issue access requests to the virtual disk apparatus/apparatuses, the back end computer issues an appropriate request to the storage subsystems connected thereto actually, depending on the type of the virtual disk apparatus/apparatuses to which the requests have been issued.

According to the present invention, it becomes possible to implement all the data manipulations, such as the data migration among the disk apparatuses and on-line extension of the disk capacities, completely transparently to the host computers.

DESCRIPTION OF THE EMBODIMENTS

Figure 1:
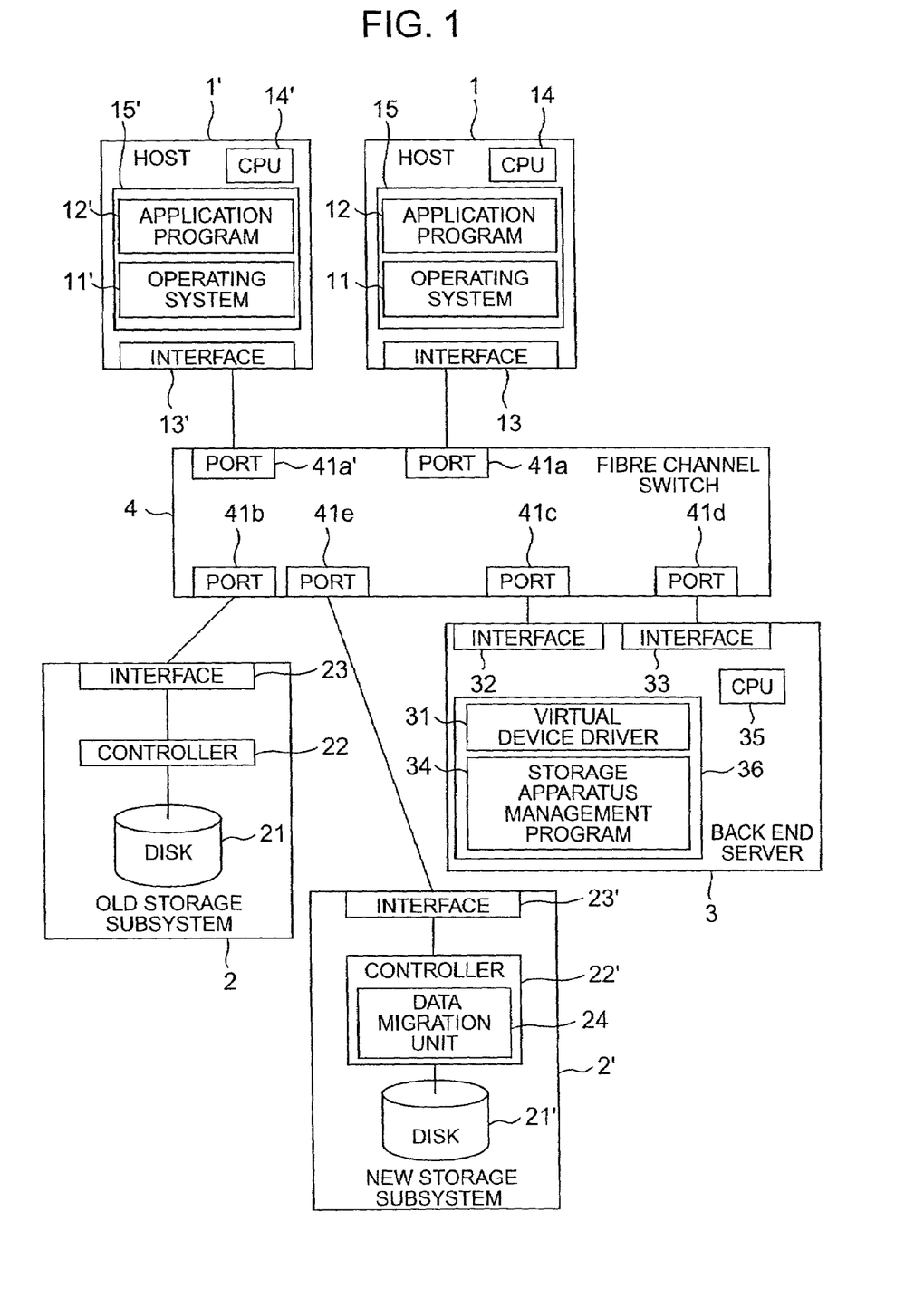
FIG. 1 is a block diagram for illustrating the configuration example of a computer system in an embodiment of the present invention.

FIG. 1 is a block diagram for illustrating the configuration example in an embodiment of a computer system to which the present invention is applied. The computer system includes hosts 1, 1', an old storage subsystem 2, a new storage subsystem 2', a back end server 3, and a fibre channel switch 4.

The host 1 includes an operating system 11, an application program 12, and an interface 13. Although, actually, the operating system 11 and the application program 12 operate on a CPU 14 and a memory 15 on the host 1, the detailed explanation will be omitted concerning these hardware configuration components. Actually, the general environment is one where, like the host 1', a plurality of host computers other than the host 1 are connected, but only the operation of the host 1 as the host computers will be described for simplifying the operation of the present invention. In the host 1', the components with apostrophe are the same as or equivalent to the corresponding components in the host 1.

The old storage subsystem 2 includes a disk 21, a controller 22, and an interface 23. Even if the disk 21 is a logical drive that is made to disguise a single logical disk apparatus by integrating a plurality of physical disks, the contents of the present invention remain unchanged. The interface 23 is connected to the fibre channel switch 4.

As is the case with the old storage subsystem 2, the new storage subsystem 2' also includes a disk 21', a controller 22', and an interface 23'. The point that differs from the old storage subsystem 2 is that a data migration unit 24 is included in the controller 22'.

The back end server 3 includes a virtual device driver 31 and interfaces 32 and 33. The virtual device driver 31 is a software that operates on a CPU 35 and a memory 36 on the back end server 3, and it is possible for the user to modify the setting thereof from the outside or to replace the program itself. The detailed explanation will be omitted regarding the hardware configuration components such as the CPU 35 and the memory 36.

The fibre channel switch 4, which includes a plurality of ports 41a, 41a', 41b, 41c, 41d, and 41e (hereinafter, abbreviated generically as a port 41), is used for interconnecting the host 1, the old storage subsystem 2, the new storage subsystem 2', and the back end server 3. Accessing any of the ports 41a', 41b, 41c, 41d, and 41e is possible from the port 41a. This condition allows the host 1 to directly access the old storage subsystem 2 and the new storage subsystem 2' from the ports 41b and 41e, respectively. In the present embodiment, however, it is assumed that, basically, the host 1 accesses the old storage subsystem 2 and the new storage subsystem 2' all through the back end server 3.

The explanation will be given below concerning the role of the back end server 3. The virtual device driver 31 makes the back end server 3 look as if it were one disk apparatus or a plurality of disk apparatuses when seen from the host 1. In the present embodiment, it is assumed that, when the host 1 looks at the back end server 3 through the port 41d, the host 1 sees one disk apparatus as if it were connected to the port 41d. Hereinafter, this disk apparatus will be referred to as a virtual disk.

The virtual device driver 31 is set so that, when seen from the host 1, the virtual disk at first looks the same as the disk apparatus 21 in the old storage subsystem 2. Namely, if the host 1 accesses, for example, a logical block address (LBA) 0 in the virtual disk, the virtual device driver 31 accesses LBA 0 in the disk apparatus 21 via the interface 32 and the port 41c, then returning the result back to the host 1 via the interface 33 and the port 41d. In the embodiment of the present invention, although the interface 32 is used for accessing the disk 21 or the disk 21' and also the interface 33 is used for the communications with the host 1, it is possible to cause a single interface to play these two roles.

Here, attention should be paid to the following point: Modifying the setting of the virtual device driver 31 makes it possible to make the virtual disk look as if it were the disk apparatus 21' in the new storage subsystem 2'. When this setting modification is performed, the virtual disk that the host computer sees remains unchanged. Even if the virtual disk is modified from the disk 21 to the disk 21' by the setting modification of the virtual device driver 31, the port ID and LUN of the virtual disk that the host 1 is made to see remain unchanged. As a result, the host 1 has none of the recognition that the actually accessed disk has been changed.

Next, the explanation will be given below regarding the data migration unit 24 in the new storage subsystem 2'. The data migration unit 24 has a unit similar to the unit disclosed in U.S. Pat. No. 5,680,640. If the data migration is instructed, the data migration unit 24 reads the data sequentially from the front-head of the disk 21 in the old storage subsystem 2, then writing the data into the disk 21' in the new storage subsystem 2'. Moreover, the unit 24 has a table (i.e., 100 in FIG. 2) for recording whether or not the data migration has been finished in an each-block unit or in a plural-block unit. If a reading access arrives from the host computer during the data migration processing, the unit 24 makes reference to this table. Then, the unit 24 reads the data from the disk 21 in the old storage subsystem 2 with respect to regions where the data migration is not over, and returns the data in the disk 21' in the new storage subsystem 2' with respect to regions where the data migration is over.

Figure 2:
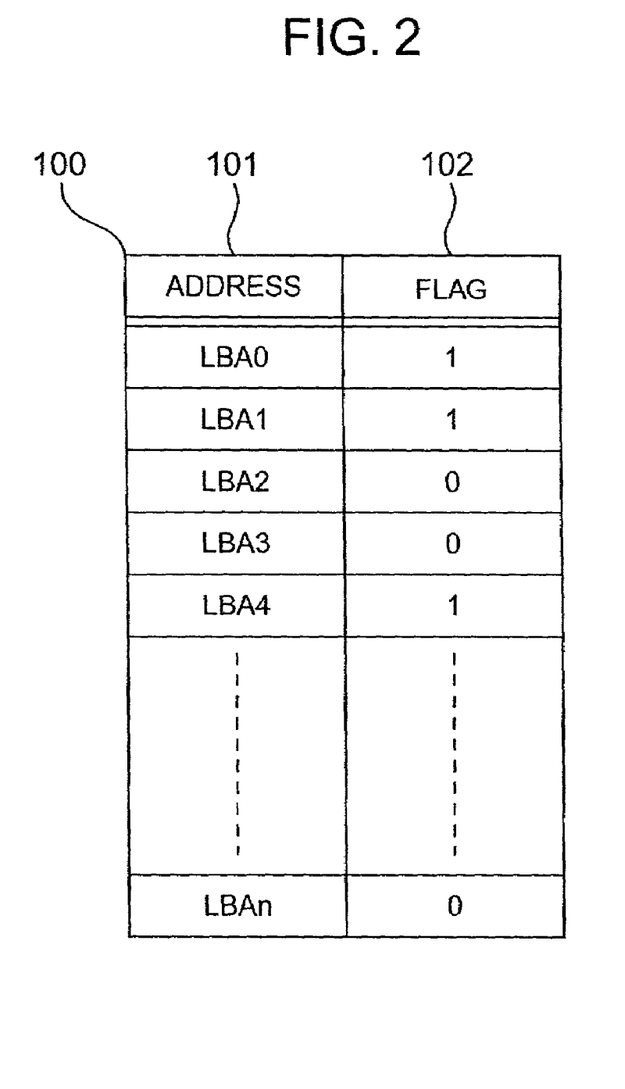
FIG. 2 is a table configuration diagram for illustrating a table used by a data migration unit toward a new storage subsystem of the present invention.

FIG. 2 illustrates the table that the data migration unit 24 has. The data migration unit 24 copies the data on each block basis from the disk 21 in the old storage subsystem 2 into the disk 21' in the new storage subsystem 2'. The table 100 includes a flag 102 for each logical block address 101. In the present embodiment, the case where the flag 102 is "1" indicates that the data at the address has been copied already from the disk 21 into the disk 21', and the case where the flag 102 is "0" indicates that the data at the address has not been copied yet. In the data migration processing, or in the data reading/writing processing based on the requests from the host computer during the data migration processing, the unit 24 makes reference to this table.

Figure 3:
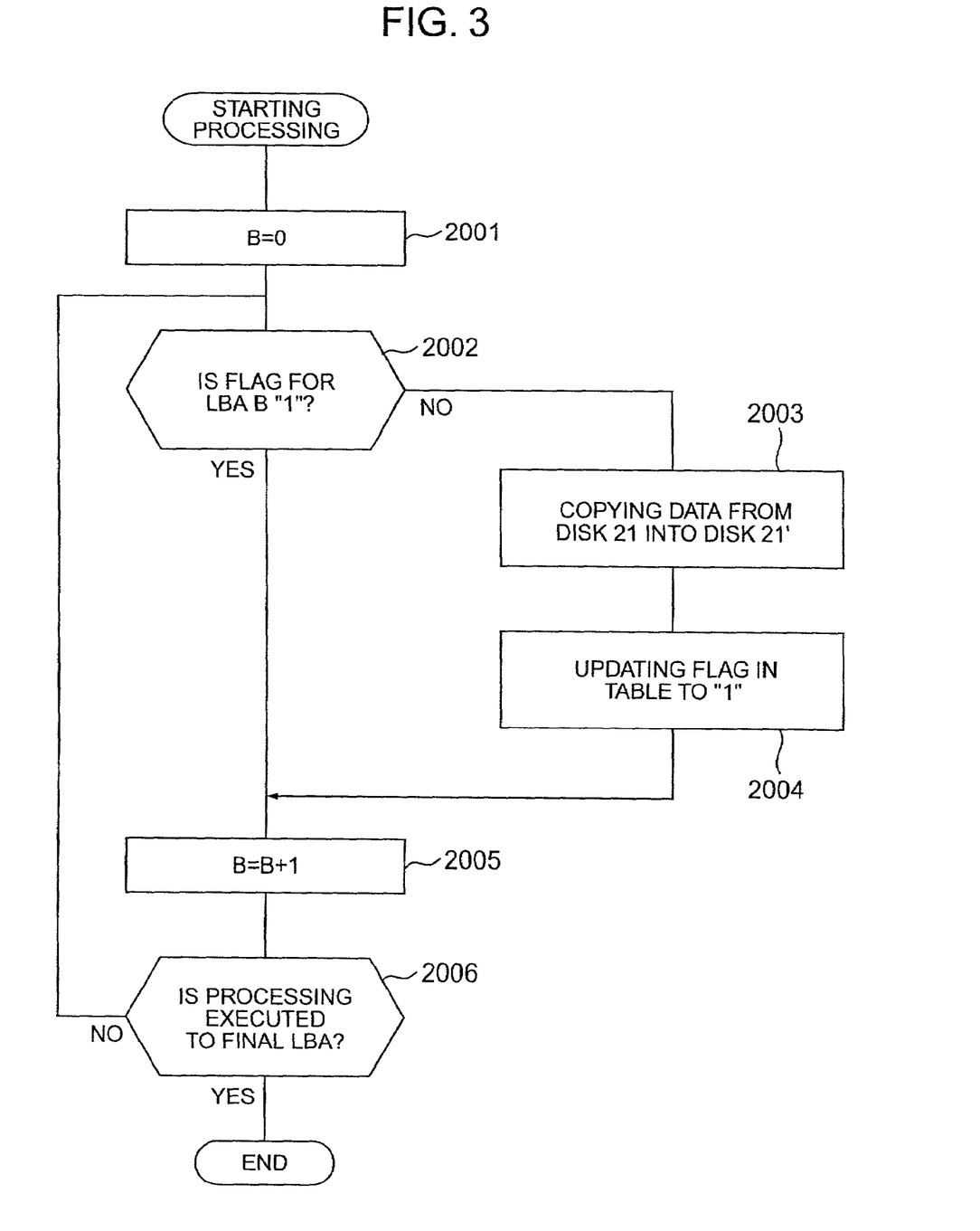
FIG. 3 is a flow chart for illustrating the flow of a data migration processing performed by the data migration unit of the present invention.

Referring to FIG. 3, the explanation will be given below concerning the flow of the migration processing performed by the data migration unit 24. First, a counter B is prepared, and the initial value is set to be "0" (step 2001). Next, reference is made to the table 100, thereby checking whether or not the flag 102 for LEA B is "1" (step 2002). If the flag is "1", it means that the data migration is over, and accordingly the counter B is incremented by "1" (step 2005). Also, at the step 2002, if the flag 102 is "0", the data is copied from the disk 21 into the disk 21' (step 2003). Then, the corresponding flag 102 in the table 100 is updated to "1" (step 2004), and the processing goes to the step 2005. At a step 2006, it is checked whether or not the processing has been executed to the final LBA of the disk 21. Namely, it is checked whether or not B has exceeded the final LBA of the disk 21. If B has exceeded the LEA, the processing is completed. If not, the processing goes back to the step 2002, then being repeated.

Figure 4:
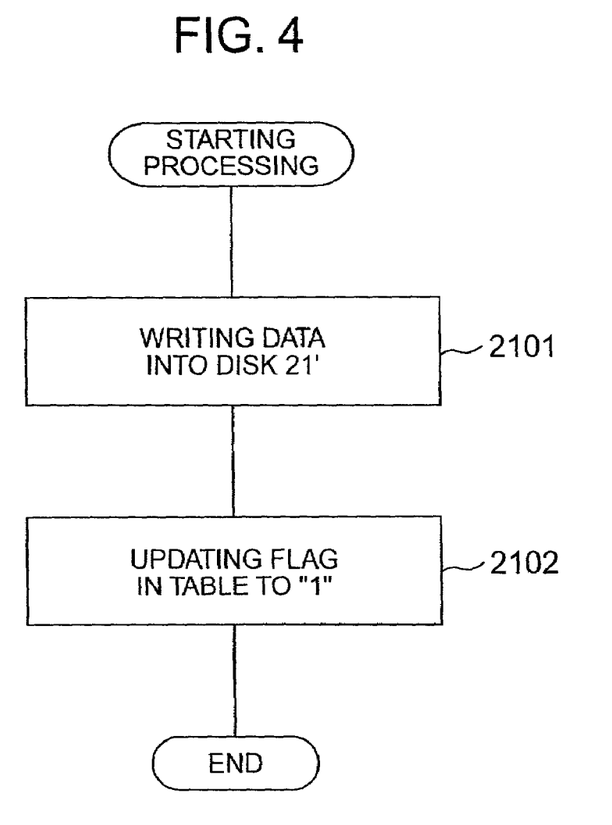
FIG. 4 is a flow chart for illustrating the flow of a processing performed by the data migration unit when a writing request arrives during the data migration processing.

Next, referring to FIG. 4, the explanation will be given below regarding a processing in the case where, while the data migration unit 24 is executing the data migration processing in FIG. 3, there has arrived the writing request from the host computer, i.e., the back end server 3 (or the host 1) in the present embodiment. In the case where the block unit of the written-in data from the host coincides with the unit of LEA, this processing is simple: At a step 2101, the data is written into the disk 21' in the new storage subsystem 2', and at a step 2102, the flag 102 for the corresponding LBA in the table 100 is updated to "1". Namely, with respect to the LBA for which the writing processing has been performed during the data migration processing, it becomes unnecessary to execute the data migration from the disk 21 in the old storage subsystem 2.

Figure 5:
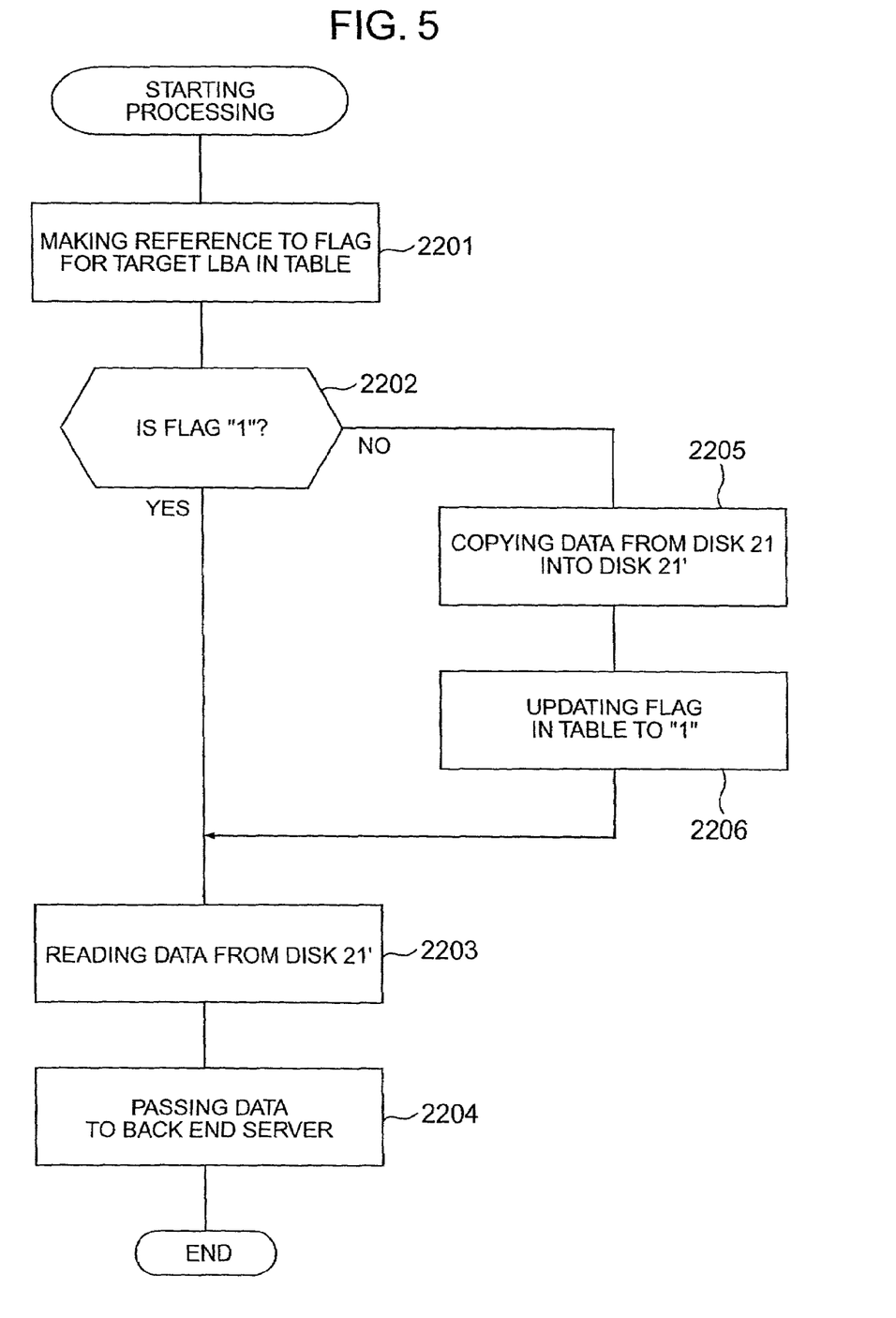
FIG. 5 is a flow chart for illustrating the flow of a processing performed by the data migration unit when a reading request arrives during the data migration processing.

Referring to FIG. 5, the explanation will be given below concerning a processing in the case where, while the data migration unit 24 is executing the data migration processing in FIG. 3, there has arrived the reading request from the host computer, i.e., the back end server 3 in the present embodiment. At a step 2201, reference is made to the flag 102 for the LBA within the table 100 for which there has arrived the reading request. At a step 2202, it is checked whether or not the flag 102 for the corresponding LBA is "1", thereby branching the processing. If the flag is "1", the data migration from the disk 21 in the old storage subsystem 2 into the disk 21' in the new storage subsystem 2' has been finished with respect to the LBA, and accordingly the data is read from the disk 21' (step 2203). If the flag 102 is "0", the data migration has been not finished yet with respect to the LBA, and accordingly the data is copied from the disk 21 into the disk 21' once (step 2205). Subsequently, the flag 102 in the table 100 is updated to "1" (step 2206). After that, the processing goes to the step 2203 or after. At a step 2204, the read-out data is passed over to the back end server 3, thereby completing the processing.

In this way, it turns out that, even during the data migration, the back end server 3 always executes the data reading/writing with respect to the disk 21' in the new storage subsystem 2'.

Next, concerning the data migration processing from the old storage subsystem 2 to the new storage subsystem 2' in the system of the present embodiment, the flow of the entire system will be explained. When executing the data migration, the user instructs the back end server 3 to start the migration. The data-migration-processing starting instruction from the back end server 3 to the new storage subsystem 2' is transmitted to the new storage subsystem 2' via the interface 32.

Figure 6:
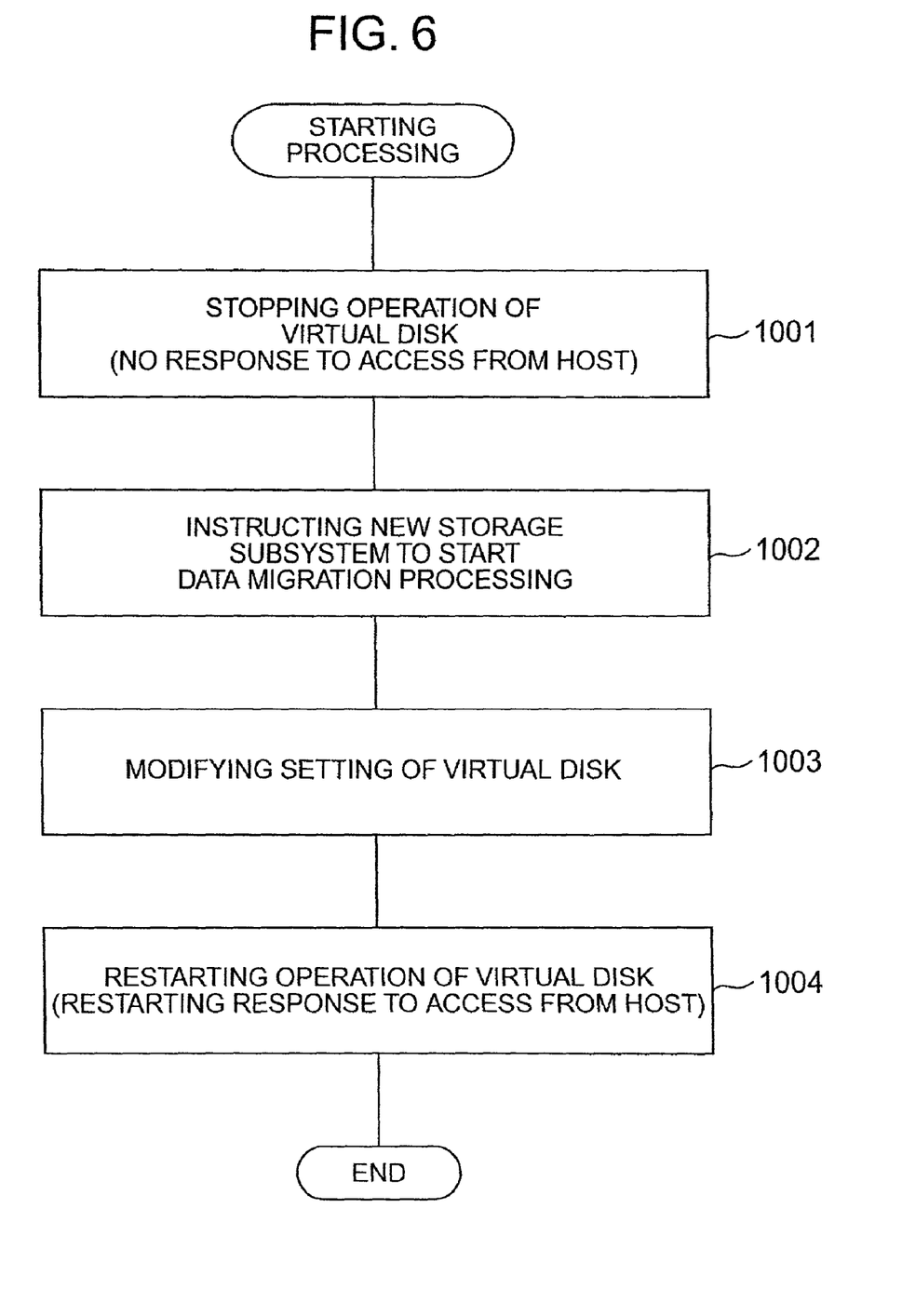
FIG. 6 is a flow chart for illustrating the flow of a processing performed by a back end server when the data migration processing from an old storage subsystem to the new storage subsystem is performed in the computer system in the embodiment of the present invention.

FIG. 6 explains the flow of a virtual disk's setting modification processing executed by the back end server 3. If the back end server 3 receives the migration instruction, at first, the server 3 stops the operation of the virtual disk by the virtual device driver 31 (step 1001). This interrupts the access from the virtual device driver 31 to the old storage subsystem 2. As a result, even if the virtual device driver 31 receives an access command to the virtual disk from the host 1, the driver 31 returns no response until the access halt is cleared. Next, a storage apparatus management program 34 instructs the new storage subsystem 2' to start the data migration processing illustrated in FIG. 3 (step 1002). Moreover, at a step 1003, the setting of the virtual disk that the virtual device driver 31 has caused the host 1 to access the disk 21 so far is modified so that an access to the disk 21' will be made. Finally, at a step 1004, the access halted at the step 1001 is restarted. When the access to the virtual disk from the host 1 is restarted, if accesses have been made to the virtual disk from the host 1 between the step 1001 and the step 1002, the accesses are all carried out with respect to the disk 21'.

Figure 7:
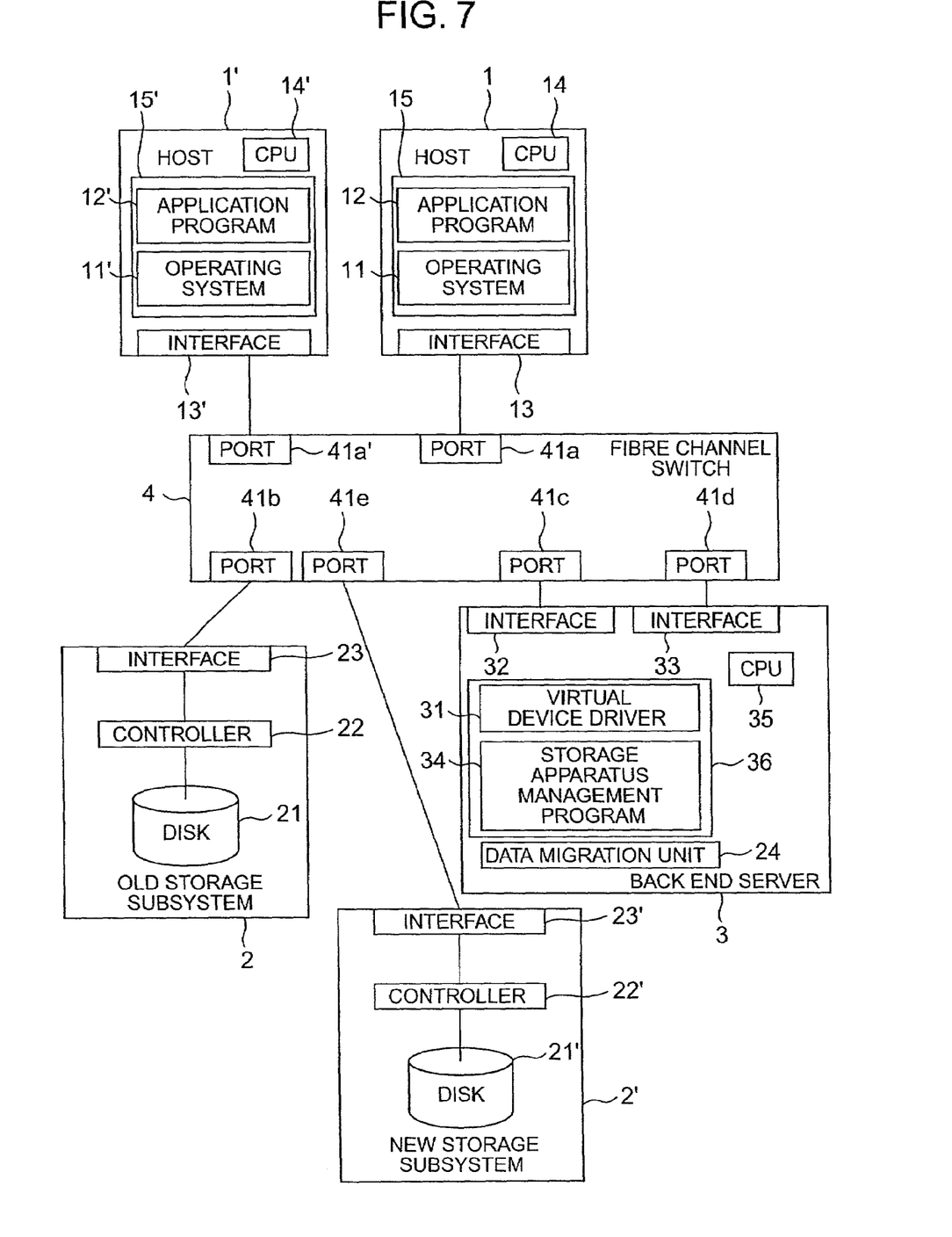
FIG. 7 is a block diagram for illustrating the configuration example of another computer system embodying another embodiment of the present invention.

Also, in the present embodiment, there has been provided the connection configuration where the old and the new storage subsystems 2 and 2' and the back end server 3 are directly connected to the switch. However, in the case where, unlike the example in FIG. 1, the additionally-installed new storage subsystem 2' does not include the data migration unit 24, the data migration unit 24 is included on the side of the back end server 3 as is illustrated in FIG. 7. Then, the back end server is caused to execute the data migration processing, which makes it possible to implement the same processing.

Figure 8:
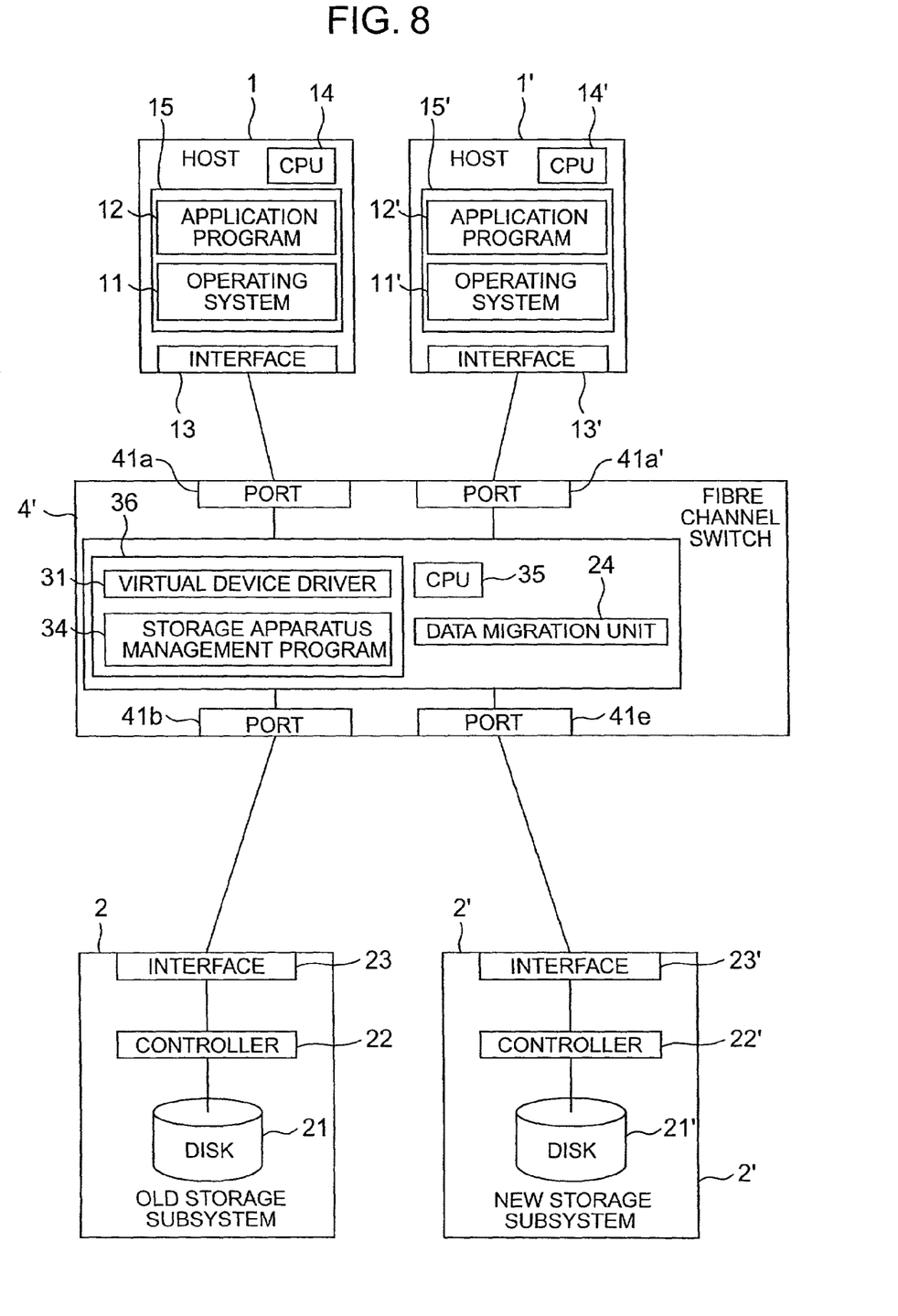
FIG. 8 is a block diagram for illustrating the configuration example of another computer system embodying another embodiment of the present invention.
Figure 9:
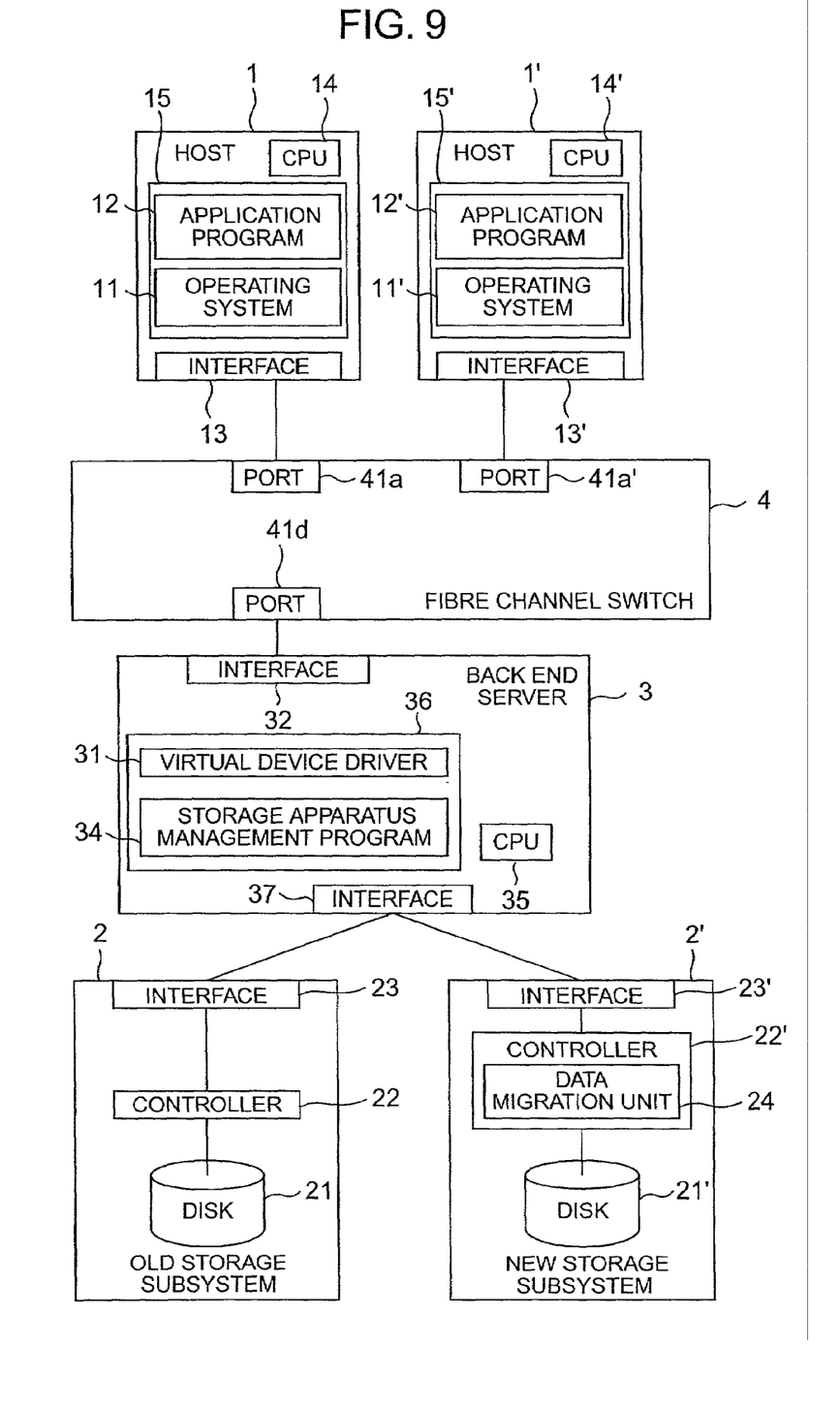
FIG. 9 is a block diagram for illustrating the configuration example of another computer system embodying another embodiment of the present invention.

Moreover, in the present embodiment, there has been provided the back end server 3, thereby presenting the processing for making the host see the virtual disk. As illustrated in FIG. 8, however, it is also possible to implement a configuration where the virtual device driver 31, the storage apparatus management program 34, and the data migration unit 24 are included in the fibre channel switch 4. Also, as illustrated in FIG. 9, it is also possible to implement even a configuration where the storage subsystems 2 and 2' are connected to each other via an interface 37 of the back end server 3. In that case, the data migration unit 24 may also be included on the side of the back end server 3.

Although, in the present embodiment, there has been presented the example where the data migration among the disks can be executed transparently to the host computer, there exist a variety of examples to which the embodiment is applicable. If the virtual device driver causes the virtual disk to correspond to the real storage apparatuses, it does not matter at all to the host computer which storage apparatus actually stores the data. This makes the embodiment applicable to the following systems, for example: A storage apparatus management system where a virtual disk with a necessary minimum capacity is defined usually, and a virtual disk with a necessary capacity can be prepared dynamically at a point-in-time when it becomes required, and a system that, depending on the data access frequency, migrates the data transparently to the host and dynamically from a low-rate disk to a high-rate disk.

What is claimed is:

1. A storage server for providing a virtualized storage subsystem accessible by a plurality of hosts, the storage server comprising:
   a first communication interface coupled with a first network switch to receive at least one data access request requesting an access to the virtualized storage subsystem from one of the hosts that is coupled with the network switch;
   a second communication interface coupled with a second network switch to communicate with a first and a second storage subsystem including first and second storage areas, respectively, to store data associated with the access requesting host, the first and second storage subsystems being provided at remote locations from the storage server; and
   a virtual device driver component that is operable to present a virtual storage area of the virtualized storage subsystem to the access requesting host, the virtual storage area being mapped to the first storage area of the first storage subsystem prior to migration of data from the first storage subsystem to the second storage subsystem,
   wherein the storage server is configured to receive, from the access requesting host, a first data access request requesting reading of data stored in the virtualized storage subsystem, the first data access request including a storage address identifying a first location in the virtual storage area of the virtualized storage subsystem, to generate a second data access request directed to the first storage subsystem, the second data access request including a storage address identifying a second location in the first storage area that is mapped to the first location in the virtual storage area of the virtualized storage subsystem, to copy the data received from the first storage subsystem to a third location in the second storage area of the second storage subsystem, and to send the received data to the access requesting host, and
   wherein the storage server is configured to change mapping of the first location in the virtual storage area of the virtualized storage subsystem from the second location in the first storage area to the third location in the second storage area so that the access requesting host accesses the first storage subsystem and the second storage subsystem through the storage server.

2. The storage server of claim 1 wherein if the storage server receives, from the access requesting host, a third data access request including the storage address identifying the first location in the virtual storage area of the virtualized storage subsystem after the copying of the data, the storage server is configured to generate a fourth data access request directed to the second storage subsystem, the fourth data access request including a storage address identifying the third location in the second storage area.

3. The storage server of claim 1, wherein the first and second network switches are the same.

4. The storage server of claim 1, wherein the storage server is configured to initiate migration of data that has not been copied from the storage area of the first storage subsystem to the storage area of the second storage subsystem, while stopping data access operation from the hosts to the virtualized storage subsystem.

5. The storage server of claim 1, wherein when the storage server receives, from the access requesting host, a data access request requesting an access to a portion of the data stored in the first storage area while the data stored in the first storage area is migrated to the second storage area, the storage server accesses a data migration unit to determine whether the data access request should be directed either to the first storage subsystem or the second storage subsystem, with the data migration unit maintaining a record on portions of the data stored in the first storage area that remain in the first storage area while the data stored in the first storage area is migrated to the second storage area.

6. The storage server of claim 5, wherein the data migration unit is provided in one of the first and second storage subsystems or the storage server.

7. A storage system coupled with a network switch, comprising:
   a backend server coupled with a plurality of hosts via a network;
   a first storage subsystem including a first storage controller and a plurality of first storage devices, the first storage controller configured to control access to the first storage devices, the first storage devices defining a first storage area, the first storage subsystem being coupled with the backend server via the network; and
   a second storage subsystem including a second storage controller and a plurality of second storage devices, the second controller configured to control access to the second storage devices, the second storage devices defining a second storage area, the second storage subsystem being coupled with the backend server via the network,
   wherein the backend server, the first storage subsystem, and the second storage subsystems are all remotely located from each other,
   wherein the backend server presents a virtualized storage subsystem to the hosts, the virtualized storage subsystem including a virtual storage area being mapped to the first storage area of the first storage subsystem prior to migration of the data from the first storage subsystem to the second storage subsystem,
   wherein the backend server is configured to receive, from the host, a first data access request requesting reading of data stored in the virtualized storage subsystem, the first data access request including a storage address identifying a first location in the virtualized storage area of the virtualized storage subsystem, and to generate a second data access request directed to the first storage subsystem, the second data access request including a storage address identifying a second location in the first storage area that is mapped to the first location in the virtualized storage area of the virtual storage subsystem, to copy the data received from the first storage subsystem to a third location in the second storage area of the second storage subsystem, and to send the received data to the host, and
   wherein the backend server is configured to change mapping of the first location in the virtualized storage area of the virtualized storage subsystem from the second location in the first storage area to a third location in the second storage area so that the host accesses the first storage subsystem and the second storage subsystem through the backend server.

8. A method for operating a storage system with a virtualized storage subsystem, the method comprising:
   receiving a first data access request from a first host at a backend server, the first data access request requesting reading of data stored in a virtualized storage subsystem, the backend server being coupled with a plurality of hosts and first and second storage subsystems via a network, the backend server presenting the virtualized storage subsystem to the plurality of the hosts, the first data access request including a storage address identifying a first location in a virtual storage area of the virtualized storage subsystem, the first and second storage subsystems being located remotely from the backend server;

generating a second data access request at the backend server, the second data access request including a storage address identifying a second location in a first storage area that is mapped to the first location in the virtual storage area, the first storage area being defined by the first storage subsystem;

transmitting the second data access request to the first storage subsystem to copy data corresponding to data requested by the first data access request from the second location to a third location in the second storage area of the second storage subsystem;

sending the copied data to the host; and changing mapping of the first location in the virtual storage area of the virtualized storage subsystem from the second location in the first storage area to the third location in the second storage area in connection with copying the data from the second location to the third location, the second storage area being defined by the second storage subsystem.

9. The method of claim 8, further comprising:

maintaining a table holding a flag for indicating a state of copying on each data block associated with the virtual storage area.

10. The method of claim 9, wherein the table is maintained by one of the first and second storage subsystems.

11. The method of claim 10, further comprising:

receiving a third data access request at the backend server including the storage address identifying the first location of the virtual storage area of the virtualized storage subsystem from a second host after the copying of the data; and generating, by the backend server, a fourth data access request directed to the second storage subsystem, the fourth data request including a storage address identifying the third location in the second storage area.

12. The method of claim 11, wherein the first and second hosts are different hosts.

13. The method of claim 8, wherein each data block corresponds to a logical block address.

14. A storage server for providing a virtualized storage subsystem accessible by a plurality of hosts, the storage server comprising:

a first communication interface coupled with a network switch to receive a data access request requesting an access to the virtualized storage subsystem from one of the hosts that is coupled with the network switch;

a second communication interface coupled with the network switch to communicate with first and second storage subsystems including first and second storage areas, respectively, to store data associated with the access requesting host; and a virtual device driver component that is operable to present a virtual storage area of the virtual storage subsystem to the access requesting host, the virtual storage area being mapped to the first storage area of the first storage subsystem prior to migration of data from the first storage subsystem to the second storage subsystem, wherein the storage server is configured to receive, from the access requesting host, a first data access request requesting reading of data stored in the virtualized storage subsystem, the first data access request including a storage address identifying a first location in the virtual storage area of the virtualized storage subsystem, to generate a second data access request directed to the first storage subsystem, the second data access request including a storage address identifying a second location in the first storage area that is mapped to the first location in the virtual storage area of the virtualized storage subsystem, to copy the data received from the first storage subsystem to a third location in the second storage area of the second storage subsystem, and to send the received data to the access requesting host, wherein the storage server is configured to change mapping of the first location in the virtual storage area of the virtualized storage subsystem to the third location in the second storage area so that the access requesting host accesses the first storage subsystem and the second storage subsystem through the storage server, wherein if the storage server receives, from the access requesting host, a third data access request including the storage address identifying the first location in the virtual storage area of the virtualized storage subsystem via the first interface after copying of the data, the storage server is configured to generate a fourth data access request directed to the second storage subsystem and to send the fourth data access request to the second storage subsystem via the second interface, the fourth data access request including a storage address identifying the third location in the second storage area.

15. The storage server of claim 14, wherein the server is configured to initiate migration of data that has not been copied from the storage area of the first storage subsystem to the storage area of the second storage subsystem via the second interface, while stopping data access operation from the hosts to the virtualized storage subsystem.

* * * * *